United States Patent Office 3,234,145
Patented Feb. 8, 1966

3,234,145
CATALYST DEMETALLIZATION
Robert L. Foster, Homewood, Ill., assignor to Sinclair Research, Inc., Wilmington, Del., a corporation of Delaware
No Drawing. Filed Jan. 22, 1962, Ser. No. 167,903
10 Claims. (Cl. 252—413)

This invention is a method for improving the performance of catalyst in a hydrocarbon conversion system which includes removal of poisoning metals from the catalyst. The method is useful in conjunction with hydrocarbon conversion processes where the hydrocarbon feed is highly contaminated with nickel, iron and/or vanadium materials. The invention comprises removing the catalyst containing metal contaminants from the hydrocarbon conversion, treating the poisoned catalyst with a sulfiding vapor, chlorinating the catalyst at a moderate temperature, treating the catalyst with a reducing agent, washing the catalyst and returning the catalyst, of reduced poisoning metals content and improved performance characteristics to the hydrocarbon processing. The efficiency of the process for vanadium removal may be improved by contacting the catalyst at an elevated temperature with molecular oxygen-containing gas before sulfiding and the catalyst may be given an ammonium wash after the regular aqueous wash. The catalyst is treated with a reducing agent before or during the wash, and for good removal of nickel, the wash has a pH within certain defined ranges, which, however, may be less acid, and therefore less dangerous to the alumina of the catalyst than washing procedures which are not preceded by sulfidation and chlorination.

Copending application Serial No. 849,199, filed October 28, 1959, and incorporated herein by reference, describes a treatment whereby iron and vanadium poisons on a hydrocarbon conversion catalyst are treated to convert these metals to volatile chlorine compounds and removed in vapor form from the catalyst. Because of the reducing agent used in the instant invention, the chlorinating conditions need not be sufficient to convert all of the poisoning metals to the volatile chloride form and little if any evolution of volatile chlorides need occur. The process of the invention therefore may avoid the corrosion problems which sometimes occur when chlorination is performed using a promoter, as described in the above-mentioned patent application. Also, the method of this invention is an improvement over that set out in copending application Serial No. 55,838, filed September 14, 1960. This invention enables reducing agents to be employed which are in general much less costly than the chelating agents of the copending application.

Catalytically promoted methods for the chemical conversion of hydrocarbons include cracking, hydrocracking, reforming, hydroforming, coking, deasphalting, etc. Such reactions generally are performed at elevated temperatures, for example, about 300 to 1200° F., more often 600 to 1000° F. Feedstocks to those processes comprise hydrocarbons which at the temperature of the conversion reaction are generally in the fluid state and the products of the conversion frequently are lower-boiling materials. In particular, cracking of hydrocarbons is widely practiced and uses a variety of solid oxide catalysts to give end products of fairly uniform composition. The catalysts which have received the widest acceptance today are usually activated or calcined, predominantly silica or silica-based, e.g. silica-alumina, silica-magnesia, silica-zirconia, etc., compositions in a state of very slight hydration and containing small amounts of acidic oxide promoters in many instances. Of these, the synthetic gel catalysts are more uniform and less damaged by high temperatures in treatment and regeneration. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The process of this invention is applicable to these synthetic catalysts and also, when poisoned to a relatively high metals level, to "natural" and "semi-synthetic" catalysts as well.

"Natural" catalysts are usually clays of the type of kaolinite or halloysite, which have been treated for the removal of undesired components such as iron, and calcined. "Semi-synthetic" catalysts are made, for instance, by the precipitation of synthetic silica, alumina or silica-alumina on clay. One such semi-synthetic catalyst contains about equal amounts of silica-alumina gel and clay.

The physical form of the catalyst varies with the type of manipulative process to which it will be exposed. In circulating catalyst systems, such as those of the fluid catalytic and "TCC" processes, catalyst moves through a reaction zone and then through a regeneration zone. In the fluid process, gases are used to convey a catalyst which is in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Various petroleum stocks have been known to contain at least traces of many metals and to pick up tramp iron from transportation, storage and processing equipment. Most of these metals, when present in a stock deposit on the catalyst in the form of free metals or relatively non-volatile metal compounds during the conversion processes so that regeneration of the catalyst to remove coke does not remove these contaminants. It is to be understood that the term "metal" used herein refers to either form of deposit. Some metals such as iron, nickel, vanadium, and copper markedly alter the selectivity and activity of cracking reactions if allowed to accumulate. A poisoned catalyst produces a higher yield of coke and hydrogen at the expense of desired products, such as gasoline and butanes. Since many cracking units are limited by coke burning or gas handling facilities, increased coke or gas yields require a reduction in conversion or throughput to stay within the unit capacity.

An alternative to letting catalyst metals level increase and activity decrease is to diminish the metals content by raising catalyst replacement rates. Either approach, letting metals level increase, or increasing catalyst replacement rates, must be balanced against product value and operating costs to determine the most economic way of operating. The optimum metal level at which to operate any catalytic conversion unit will be a function of many factors including feedstock metal content, type and cost of catalyst, overall refinery balance, etc., and can be determined only by a comprehensive study of the refinery's operations. A further alternative, demetallizing or altering the metal content of the catalyst, which avoids discarding of expensive catalyst, and enables much lower grade, highly metals-contaminated feedstocks to be used, is now possible.

Commercially used cracking catalysts are the result of years of study and research into the nature of cracking catalysts, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important therefore, that removing poisoning metals from the catalyst does not jeopardize the desired chemical and physical constitution of the catalyst. Although methods have been suggested in the past for removing poisoning metals from a catalyst which has been used for high-temperature hydrocarbon conversions, for example, the processes of U.S. Patents 2,488,718; 2,488,744; 2,668,798 and 2,693,455; the process of this invention is effective to remove poisoning metals without endangering the expensive catalyst.

In this invention, the hydrocarbon petroleum oils utilized as feedstock for a conversion process may be of any desired type normally utilized in catalytic conversion operations and may contain much higher amounts of poisoning metals than generally are tolerable. The feedstock sometimes has as much as 30 or even 300 p.p.m. metal poisons and the catalyst may be used as a fixed, moving or fluidized bed or may be in a more dispersed state. The cracking normally is conducted at temperatures of about 750 to 1100° F., preferably about 850 to 950° F., at pressures up to about 200 p.s.i.g., preferably about atmospheric to 100 p.s.i.g., and without substantial addition of free hydrogen to the system to give a conversion of about 50–60 percent of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. In the process of this invention the regeneration of any particular quantum of catalyst is generally continued until the carbon content is less than about 0.5%. After regeneration, subjecting the poisoned catalyst sample to magnetic flux may be found desirable to remove any tramp iron particles which may have become mixed with the catalyst.

After removal from the hydrocarbon conversion system, the catalyst is sulfided and chlorinated. The chlorination treatment removes or enables removal of nickel, vanadium and iron from the catalyst and sulfiding has an added large beneficial effect on nickel and iron removal. Contact of the catalyst with the reducing agent before or during the wash affects the removal of available vanadium and/or iron and also improves catalyst characteristics in later hydrocarbon processing even in the absence of available iron or vanadium.

Sulfiding is performed, before chlorination, by contacting the catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F. Other treating conditions can include a sulfur-containing vapor partial pressure of about 0.1 to 30 atmospheres or more, preferably about 0.5–25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximately 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix.

The chlorination is performed by contact of the poisoned catalyst with a gaseous chlorinating agent at room temperature up to a temperature of about 900° F., preferably about 400 to 650° F. The chlorination is effective for conversion of the poisoning metals to chloride forms, removable in the later wash if not by volatilization during chlorination. The contact with the chlorinating agent may be at atmospheric pressure, or below or above. Subatmospheric pressures may be achieved by the use of vacuum or preferably by dilution with inert gas such as nitrogen or flue gas. Generally at whatever pressure is used, at least about 0.5 or 1 weight percent chlorinating agent, based on the catalyst, is employed. The upper limit is based on economics; no reason has been found to use more than about 10% chlorinating agent, but 25% of more could be used. The time of contact, of course, depends on the type and amount of agent supplied per unit time and is sufficient to give conversion of substantial nickel to nickel chloride and to substantially improve the effect of the wash on other poisoning metals. 15 minutes to 2 hours is a practical time range but the chlorination may be accomplished in 5 minutes or may take 5 or more hours. The contact with chlorinating agent may be followed by a purge with an inert gas such as nitrogen or flue gas to remove entrained chlorine.

It has been found that molecular chlorine vapors are in themselves sufficient to chlorinate the catalysts for subsequent removal of metal poisons by the wash. The chlorination is preferably not sufficient to achieve a significant amount of volatilization of chlorides such as iron and vanadium chlorides. This invention, therefore, can produce a reduction in reagents costs as well as the elimination of corrosion problems sometimes experienced when a promoter such as those mentioned below is used in the chlorination. Also, the disposal of gas containing metal chloride vapor is not a problem, the effluent gas from the unpromoted process containing little more than $Cl_2$, HCl and perhaps small amounts of $SO_2$ and sulfur chlorides. Also, this effluent gas is suitable for recycle with little or no intermediate treatment. Because of the milder chlorination procedure usable in this invention less chlorine may be put on the catalyst, thereby affording less chance of catalyst damage in later stages of the demetallization process or in subsequent use of the catlyst for hydrocarbon conversion.

The chlorinating agent may be a vapor containing chlorine or sometimes HCl in combination with carbon or sulfur compounds. Mixtures of chlorine with, for example, a chlorine-substituted light hydrocarbon, such as $CCl_4$, may be used as such, or may be formed in-situ by the use of, for example, a vaporous mixture of chlorine gas with low molecular weight hydrocarbons such as methane, n-pentane, etc. The carbon or sulfur compound promoter would generally be used in the amount of about 1 to 5 to 10% or more, preferably about 2 to 3%, based on the weight of the catalyst for good removal of iron and vanadium by volatilization. A chlorinating gas comprising about 1 to 25 weight percent chlorine, based on the catalyst, together with 1% or more $S_2Cl_2$ gives good results. A "saturated" mixture of $CCl_4$ and $Cl_2$ or HCl can be made by bubbling chlorine or HCl gas at room temperature through a vessel containing $CCl_4$; such a mixture generally contains about 1 part $CCl_4$ to 5–10 parts of $Cl_2$ or HCl.

The chlorinating agent is usually essentially anhydrous, that is, it has no separate water phase when in liquid form. As the amount of water in the agent increase, additional time and/or agent may be required to obtain a given amount of metal removal, probably due to decomposition of some of the chlorine by water, producing HCl. This harmful effect is also evident when water is present in the catalyst, so that it is preferred that the catalyst contains less than about 1 or 2% matter volatile at 1000° C.

The process of this invention improves catalyst performance by treating the catalyst with a reducing agent and an aqueous medium. The exact nature of this medium may sometimes vary with results desired and with the preliminary treatments given the catalyst. In general, however, the aqueous treatment removes available metals and improves catalyst activity and selectivity by submitting the catalyst to the action of a reducing agent prior to or concurrently with the aqueous wash.

A number of reducing agents are available for use in the aqueous wash medium. Such agents are at least partially water-soluble, having a single electrode reduction potential at 25° C. of less than about 0.8 volt and do not leave a deleterious contaminant on the catalyst. Preferably sulfur-containing inorganic reducing agents are employed, of which $H_2S$ is the most commercially feasible. Generally, a pH below about 4 or even 5 is used in the aqueous medium for best metals removal. $H_2S$ gas may be bubbled into the water to make the aqueous medium and this gas is generally readily available in the petroleum refinery. Even the effluent from the sulfider of the demetallization system contains sufficient $H_2S$ for this purpose. Sulfurous acid may be used in the aqueous medium but it is weak and requires considerable reagent and a low pH for good removal. Hydro sulfite is a stronger reducing agent and is effective at a higher pH, but is more expensive. Other reducing agents of a wide variety are effective in metal removal. Hydoxylamine, hydrazine, sodium or ammonium hypophosphite, and hydrogen iodide are effective but more expensive.

The pH of the aqueous medium is below about 5. Above this pH metals removal is not too efficient with most reagents and with some, metal compounds tend to precipitate. At a low pH, below about 2.5, the loss of alumina from the catalyst may become significant especially when the pH is below about 2.0, so that the preferred pH of the aqueous medium is about 2.5 to 4. The chlorine entrained in the catalyst is frequently sufficient to impart the proper pH to the aqueous medium, or HCl or $NH_4OH$ may be added to the medium in the amounts desired for proper pH adjustment. The reducing agent is used in amounts sufficient to give the desired removal of available metals from the catalyst and improvement in catalyst performance, say at least about 0.1% reducing agent based on catalyst weight, in solution in tap water or distilled or deionized water. The upper limit on the reagent is generally determined by economic factors. Rarely would more than 10% be used. The preferred amount is about 0.2 to 5%. Slurry concentrations from about 5–40% solids can be used with convenience in the washing step. The washing temperature can, for example, be about 40–200° F. but preferably is about room temperature, that is, about 60–100° F. The slurry of catalyst in this aqueous medium may be brought to this temperature when heat is imparted to the medium by hot catalyst following a chlorination at somewhat elevated temperature. During the washing, the catalyst can be stirred enough so that it is suspended in the solution.

When a gaseous reducing agent is supplied to the catalyst between the chlorination and aqueous wash treatments it may be any of the reducing agents mentioned above which is volatile at the reaction conditions. $H_2S$ gas, for example, may be employed at a temperature of about 100 to 500° F., preferably at about 200° F. A very high temperature should be avoided in order to avoid sulfiding the metal contaminants. Hydrogen gas may be used in this temperature range, but although it aids iron removal, its effect on vanadium removal is negligible. When a reducing gas is employed, it is followed by an aqueous wash, preferably in the pH range outlined above.

The effectiveness of the chlorination and aqueous treatment may sometimes be improved by treatment of the poisoned catalyst with molecular oxygen-containing gas for stabilization of metal, especially vanadium, in a higher valence state. This treatment is described in co-pending application Serial No. 19,313, filed April 1, 1960, and hereby incorporated by reference. The temperature of this treatment is generally in the range of about 1000 to 1800° F. but below a temperature where the catalyst undergoes any substantial deleterious change in its physical or chemical characteristics. The catalyst is in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst should be at least long enough to convert a substantial amount of vanadium to a higher valence state. The treatment of the poisoned catalyst with molecular oxygen-containing gas is preferably performed at a temperature of about 1150 to 1350 or even as high as 1600° F. The upper temperature, to avoid undue catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment to a time just long enough not to damage the catalyst. The oxygen-containing gas used in the treatment contains molecular oxygen as the essential active ingredient. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. Preferably a temperature of about 1200 to 1400° F. and a gas containing about 20–100% oxygen is employed at about atmospheric pressure.

After the aqueous wash, the catalyst may be washed again, with a basic aqueous medium as set forth in co-pending application Serial No. 39,810, filed June 30, 1960, incorporated herein by reference. The pH of the wash is frequently greater than about 7.5 and preferably the solution contains ammonium ions. The solution preferably is substantially free, before contact with the catalyst, of any contaminant materials which would remain deposited on the catalyst. The ammonium ions may be $NH_4^+$ ions or organic-substituted $NH_4^+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the final aqueous wash, the catalyst is conducted to a hydrocarbon conversion system, although it may be desirable first to dry the catalyst filter cake or filter cake slurry at say 250 to 450° F. and also, as pointed out above, prior to reusing the catalyst in the conversion operation it can be calcined, say at temperatures usually in the range of about 700 to 1300° F. Drying the catalyst at a low temperature, for example, about 400° F., after washing, removes residual chloride on the catalyst, but the rate of evolution increases at higher temperatures. A short calcination at 1000° F. or higher effectively lowers chloride to an acceptable level (0.005%) and it is possible that any chloride can be removed simply by adding the treated catalyst to the conversion unit regenerator.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. of poisoning metal will be accumulated on the catalyst before demetallization is warranted. The metal poison level at which the cracking system may operate without serious detrimental effects, and the metal poison level at which demetallization is most effective may vary with the type of catalyst employed. In the use of some catalysts demetallization and improvements in cracking are not significant unless about 1000 p.p.m. NiO and/or 1500 p.p.m. $V_2O_5$ are allowed to accumulate. A small portion of the catalyst is preferably removed from the hydrocarbon conversion system and given the oxygen treatment after the conventional oxidation regeneration which serves to remove carbonaceous deposits. The treatment of this invention is effective despite the presence of a small amount of carbon on the treated catalyst, but preferably the regeneration is continued until the catalyst contains not more than about 0.5% carbon before the oxygen treatment. Where the catalyst is subjected to the oxygen treatment before it is substantially carbon free, the length of oxygen treatment, as recited above, is reckoned from the time that the catalyst reaches the substantially carbon-free state that is, the state where little, if any, carbon is burned even when the catalyst is contacted with oxygen at temperatures conductive to combustion.

In practicing this invention at the refinery, a portion of the poisoned catalyst can be removed from the hydrocarbon conversion system after being regenerated, and given a high temperature treatment with an oxygen-containing gas for the length of time found to be sufficient to increase vanadium removal without damaging the catalyst. Then the catalyst may be maintained in a hydrogen sulfide or a hydrogen sulfide-inert gas mixture for one to three hours at temperatures approximating 1150° F. The sulfiding gas is purged from the catalyst by an inert gas, perhaps at a cooler temperature, then chlorinated in the temperature range outlined and washed with the aqueous medium. The treated catalyst can be returned to the unit, for example, to the regenerator reducing greatly the new catalyst requirement. The amount of Ni, V or Fe removed in practicing the procedures outlined or the proportions of each which are removed may be varied by the proper choice of treating conditions. It may prove advantageous, in the case of very severely poisoned catalysts, to repeat the treatment to reduce the metals to an acceptable level, or further improve catalyst characteristics perhaps with variations where one metal is greatly in excess.

The apparatus used to perform the process of the invention may be suitable for conducting part or all of the procedures with fluidized beds of finely divided catalyst in the various operations. When fluidized manipulations are to be used, the various gas or vapor treating agents described may be supplemented with inert fluidizing gases, such as nitrogen, where the flow of active gas is not sufficient for fluidization.

EXAMPLES

The following examples are illustrative of the invention but should not be considered limiting. In the examples, washing was conducted with a 20% slurry of catalyst in an aqueous medium comprising tap water. The washing was followed by filtration and reslurrying twice in tap water before a final rinse. Each catalyst sample was dried in an oven at about 500° F. before analysis and test cracking. Where a negative value is given for iron removal, the iron level increased, due to dispersion of tramp iron on the catalyst.

A "Nalcat" synthetic gel silica-alumina fluid-type cracking catalyst composed of about 25% $Al_2O_3$, substantially the rest $SiO_2$, was used in a commercial catalytic cracking conversion unit, using conventional fluidized catalyst techniques, including cracking and air regeneration to convert a feedstock (A) comprising a blend of Wyoming and Mid-Continent gas oils containing 1.0 p.p.m. Fe, 0.3 p.p.m. NiO, 1.2 p.p.m. $V_2O_5$ and about 2 weight percent sulfur. This gas oil blend had a gravity (API) of 24°, a carbon residue of about 0.3 weight percent and a boiling range of about 500 to 1000° F. When this catalyst had a poisoning metals content of 328 p.p.m. NiO, 4320 p.p.m. $V_2O_5$ and 0.288% Fe, a batch of this base catalyst was removed from the cracking system after regeneration. A portion of this base catalyst was used to test-crack a petroleum hydrocarbon East Texas gas oil fraction (feedstock B) having the following approximate characteristics:

| | |
|---|---|
| IBP (° F.) | 490–510 |
| 10% | 530–550 |
| 50% | 580–600 |
| 90% | 650–670 |
| EP | 690–710 |
| Grav. (° API) | 33–35 |
| Visc. (SUS) at 100° F. | 40–45 |
| Aniline point, ° F. | 170–175 |
| Pour point, ° F. | 35–40 |
| Sulfur, percent | 0.3 |

The average results of nine runs using this base catalyst are as follows:

| | |
|---|---|
| Relative activity (RA) | 37.5 |
| Distillate+loss (D+L) | 33.4 |
| Gas factor (GF) | 1.45 |
| Coke factor (CF) | 1.19 |
| Gas gravity (GG) | 1.11 |

Table I below compares the effect of pH, amount of reducing agent and time of washing when using sulfurous acid in the aqueous medium. The samples were air-treated for one hour at 1300° F., and sulfided with $H_2S$ and chlorinated with chlorine gas before washing. The pH was adjusted with HCl or NH₄OH where necessary.

The polythionic acid reagent (Wachenroder's solution) was prepared by bubbling H₂S into sulfurous acid (Baker

*Table I*

| Sample | 76A | 76B | 76D | 80D | 79C | 80C | 79F | 79E | 81B |
|---|---|---|---|---|---|---|---|---|---|
| Sulfidation: | | | | | | | | | |
| Time (hrs.) | 2 | 2 | 2 | 1½ | 1½ | 1½ | 1½ | 1½ | 1½ |
| Temperature, °F | 1,300 | 1,300 | 1,300 | 1,175 | 1,175 | 1,175 | 1,175 | 1,175 | 1,175 |
| Chlorination: | | | | | | | | | |
| Time (min.) | 90 | 90 | 90 | 10 | 10 | 10 | 10 | 10 | 10 |
| Temperature, °F | <120 | <120 | <120 | 600 | 600 | 600 | 600 | 600 | 600 |
| Wash: | | | | | | | | | |
| pH | 1.5 | 1.6 | 1.7 | 2.5 | 3.0 | 4.8 | 3.3 | 2.5 | 2.4 |
| Percent H₂SO₃ | 3.1 | 3.1 | 3.1 | 0 | 0.8 | 3.1 | 3.1 | 3.1 | 4.6 |
| Time (min.) | 0.25 | 1 | 10 | 10 | 10 | 10 | 10 | 10 | 10 |
| Metal Removal (Percent): | | | | | | | | | |
| Ni | 88 | 88 | 88 | 67 | 66 | 54 | 66 | 66 | 67 |
| V | 26 | 28 | 27 | 10 | 11 | 12 | 12 | 18 | 19 |
| Fe | 36 | 42 | 47 | −7 | −3 | −2 | 9 | 15 | 18 |
| Alumina Loss (Percent on cat.) | 0.02 | 0.07 | 0.31 | 0.48 | 0.19 | 0.00 | 0.01 | 0.28 | 0.48 |
| Test Cracking Results: | | | | | | | | | |
| RA | | | | | 36.7 | | 39.4 | 41.6 | 42.8 |
| D+L | | | | | 34.1 | | 35.5 | 36.6 | 37.1 |
| GF | | | | | 1.47 | | 1.35 | 1.21 | 1.17 |
| CF | | | | | 1.33 | | 1.05 | 1.07 | 1.05 |
| GG | | | | | 1.07 | | 1.21 | 1.28 | 1.30 |

The figures in Table I show that lower pH's are beneficial for metals removal, but too low a pH may cause alumina loss. Also, a certain minimum amount of reducing agent is needed for efficient metal removal while the time of the treatment need not be especially prolonged. The test cracking results were obtained using feedstock B described above.

Table II below shows the effectiveness of a number of reducing agents in the aqueous medium for metals removal. The ammonium hydrosulfite was prepared from sulfurous acid by reduction with aluminum metal. A column (10 x 400 mm.) was packed with 8–20 mesh granular aluminum. The aluminum was washed with dilute HCl and then with water. Sulfurous acid was then passed slowly through the column and the yellow acid effluent was neutralized as it collected to the point at which it became colorless. The solution contained dissolved aluminum.

6% SO₂) at 0° C. The solution thus prepared contained colloidal sulfur. In Example 73B, 25 milliliters of solution was diluted to 200 ml. and used to wash 50 g. of catalyst. Other reagents used were the usual commercial reagent grade chemicals. In each example the sample was treated with air at 1300° F. and sulfided at 1175° F. for 1 to 1½ hours before chlorination with chlorine at the temperature shown.

*Table II*

| Sample | 90A | 73B | 81D | 81E | 5F | 91F |
|---|---|---|---|---|---|---|
| Chlorination Temperature, °F | 600 | 200 | 600 | 600 | 600 | 600 |
| Wash: | | | | | | |
| Reagent | None | Polythionic acid | Na₂S₂O₃ | Na₂S₂O₃ | (NH₄)₂S₂O₃ | Na₂S₂O₄ |
| Percent Reagent | | | 3.2 | 1.6 | 2.0 | 4 |
| pH | 2.9 | 2.7 | 2.3 | 3.2 | 3.3 | 3.4 |
| Percent Metal Removal: | | | | | | |
| Ni | 71 | 76 | 67 | 67 | 79 | 73 |
| V | 14 | 16 | 22 | 20 | 24 | 27 |
| Fe | 2 | 23 | 25 | 25 | 28 | 29 |
| Test Cracking: | | | | | | |
| RA | 40.0 | 41.2 | 39.6 | 35.6 | 42.8 | 41.8 |
| D+L | 35.6 | 36.4 | 35.5 | 33.6 | 37.1 | 36.7 |
| GF | 1.46 | 1.05 | 1.19 | 1.32 | 1.17 | 1.26 |
| CF | 1.20 | 1.14 | 0.94 | 1.09 | 1.02 | 0.99 |
| GG | 1.13 | 1.30 | 1.29 | 1.20 | 1.28 | 1.25 |

| Sample | 11C | 87C | 90C | 90F | 91E | 89A |
|---|---|---|---|---|---|---|
| Chlorination Temperature, °F | 600 | 600 | 600 | 600 | 600 | 600 |
| Wash: | | | | | | |
| Reagent | (NH₄)₂S₂O₄ | NH₂OH | H₂NNH₂ | NaH₂PO₂ | HI | FeSO₄ |
| Percent Reagent | 1.6 | 3.8 | 5.1 | 3.5 | 4.5 | 3.1 |
| pH | 2.7 | 2.6 | 2.6 | 1.5 | 3.2 | 3.3 |
| Percent Metal Removal: | | | | | | |
| Ni | 80 | 68 | 71 | 73 | 73 | 70 |
| V | 20 | 24 | 23 | 28 | 27 | 23 |
| Fe | 16 | 19 | 14 | 24 | 23 | −19 |
| Test Cracking: | | | | | | |
| RA | 45.0 | 45.2 | 46.6 | 41.2 | 42.5 | 40.4 |
| D+L | 38.1 | 38.1 | 38.7 | 36.4 | 37.0 | 36.0 |
| GF | 1.21 | 1.21 | 1.26 | 1.19 | 1.25 | 1.50 |
| CF | 1.09 | 1.04 | 1.03 | 0.94 | 0.95 | 1.25 |
| GG | 1.27 | 1.27 | 1.24 | 1.30 | 1.27 | 1.11 |

Table II shows these reducing agents to be effective for metal, especially iron, removal and for general improvement in the cracking activity and selectivity of the catalyst. Thiosulfate is found to be very effective in a pH range below about 3.5 and a plot of metal removal against pH shows a sharp increase of removal below about four pH with excellent removal obtained at 3.0–3.5 pH.

The effect of H₂S in the aqueous medium in removing metals is shown by the following runs which employed air treatment for 2 hours at 1300° F., sulfidation for one hour at 1175° F. and chlorination at 600° F. The wash employed a saturated solution of $H_2S$ which provided about 1.3% reducing agent based on the weight of the catalyst.

*Table III*

| Sample | 97G | 97D |
|---|---|---|
| pH | 3.8 | 3.1 |
| Percent Metal Removal: | | |
| Ni | 66 | 71 |
| V | 17 | 24 |
| Fe | 20 | 26 |
| Test Cracking: | | |
| R.A | 43.7 | 46.0 |
| D+L | 37.5 | 38.5 |
| G.F | 1.29 | 1.22 |
| C.F | 0.99 | 1.07 |
| G.G | 1.27 | 1.30 |

In run 74A the regenerated catalyst sample was treated with air at about 1300° F. for one hour, with $H_2S$ sulfiding gas for 1½ hours at 1175° F., with chlorine for 10 minutes at 200° F. and then with $H_2S$ gas for reduction at about 200° F. for 10 minutes. The catalyst was then washed for 10 minutes at room temperatures in a 20% solids slurry in tap water. The pH of the slurry was 3.5. Then the catalyst was washed as an about 20% slurry in an aqueous $NH_4OH$ solution, which provided 0.8% reagent based on the catalyst, for about 10 minutes at a pH of 8.0. The treated catalyst contained 117 p.p.m. NiO, a reduction of 64%; 3483 p.p.m. $V_2O_5$, a reduction of 17%. Test cracking showed a relative activity of 37.8, distillate plus loss of 35.0, a gas factor of 1.21, a coke factor of 1.05 and a gas gravity of 1.25, significant improvements over the untreated catalyst.

Run 36C employed a natural catalyst made by acid-treating and calcination of a mixture of kaolinite and montmorillonite clays. The catalyst base analyzed about 23.9% $Al_2O_3$. This catalyst was an equilibrium catalyst which was artificially poisoned to the level given in Table IV, below by the method described in copending application Serial No. 842,604, filed September 28, 1959, incorporated herein by reference. After poisoning, vanadia on the catalyst was equilibrated by treatment with hydrogen gas at 1300° F. The poisoned catalyst was used to test-crack feedstock B, and then a sample was treated with air for one hour at 1300° F., with $H_2S$ for one hour at 1175° F., with $Cl_2$ for 10 minutes at 600° F. and then washed with a saturated solution of $H_2S$ in tap water. After drying and calcination the catalyst was analyzed and used to test-crack feedstock B. The results are given in Table IV. Run 26E employed the same treatment as 36C but applied to a semi-synthetic catalyst prepared by depositing synthetic alumina on clay and poisoning it in a pilot plant. These results also are given in Table IV.

*Table IV*

| Run | Natural Base | 36C | Semi-synthetic Base | 26E |
|---|---|---|---|---|
| NiO (p.p.m.) | 771 | 254 | 969 | 399 |
| $V_2O_3$ | 1,510 | 1,267 | 1,521 | 982 |
| Fe (percent) | 0.659 | 0.324 | 0.371 | 0.209 |
| Removal (percent): | | | | |
| Ni | | 67 | | 59 |
| V | | 16 | | 35 |
| Fe | | 51 | | 44 |
| Test Cracking: | | | | |
| RA | 22.0 | 27.2 | 24.4 | 32.6 |
| D+L | 25.0 | 28.5 | 26.6 | 32.0 |
| GF | 2.42 | 1.23 | 1.73 | 1.21 |
| CF | 2.25 | 1.03 | 1.30 | 0.94 |
| GG | 0.71 | 1.13 | 0.93 | 1.21 |

Runs 58E and 58C applied the treatment of this invention to another batch of the semi-synthetic catalyst as used in run 26E. The air treatment and sulfiding were the same as run 26E but the chlorination employed a saturated mixture of chlorine and carbon tetrachloride for one hour at 600° F. Sample 58E was washed with plain tap water at a pH of about 2.6 while run 58C used an aqueous wash containing 0.3% $H_2S$ at a pH of about 2.8. The metal removal and cracking results, given in Table V, show little metals removal due to $H_2S$ in the wash when promoted chlorination is employed, but do show a considerable improvement in the cracking effects of the catalyst after the treatment of the invention.

*Table V*

| Run | Base | 58E | 58C |
|---|---|---|---|
| Percent Metal Removal: | | | |
| Ni | | 68 | 67 |
| V | | 7 | 6 |
| Fe | | 28 | 24 |
| Test Cracking: | | | |
| R.A | 25.3 | 27.7 | 31.6 |
| D+L | 27.3 | 29.0 | 31.4 |
| G.F | 1.33 | 1.24 | 1.14 |
| C.F | 1.20 | 1.11 | 0.99 |
| G.G | 1.19 | 1.26 | 1.33 |

It is claimed:

1. In a method for treating a synthetic gel, silica-based cracking catalyst which has been poisoned by contamination with a metal selected from the group consisting of iron, nickel and vanadium due to use of said catalyst in cracking to gasoline at elevated temperature a heavier hydrocarbon feedstock containing said poisoning metal, the steps which comprise bleeding a portion of the catalyst containing said poisoning metal from the hydrocarbon cracking system, said bled catalyst being out of contact with the hydrocarbon feedstock, sulfiding poisoning metal containing component on bled catalyst by contact with a vaporous sulfiding agent at a temperature of about 500 to 1500° F., chlorinating poisoning metal containing component on the sulfided catalyst by contact with chlorinating vapors at about room temperature to 900° F., contacting the catalyst with a sulfur-containing inorganic reducing agent selected from the group consisting of reducing gases and aqueous solutions of water-soluble reducing agents in an amount sufficient to give an improvement in catalyst cracking performance, washing the catalyst with an aqueous medium having a pH below about 5 and sufficient to remove metals and improve the subsequent cracking performance of catalyst and returning the resulting demetallized catalyst to a hydrocarbon cracking system.

2. The method of claim 1 in which the reducing agent in a reducing gas.

3. The method of claim 1 in which the reducing agent is in the aqueous medium.

4. The method of claim 3 in which the pH is about 2 to 4.

5. The method of claim 4 in which the reducing agent is $H_2S$.

6. The method of claim 1 in which the catalyst is silica-alumina.

7. The method of claim 6 in which the catalyst is a semi-synthetic catalyst made by precipitation of synthetic alumina on clay.

8. The method of claim 1 in which substantially carbon-free bled catalyst, before sulfiding, is contacted with molecular oxygen-containing gas at a temperature of at least about 1150° F. and which is not deleterious to the catalyst for a time sufficient to improve vanadium removal in subsequent steps of the process.

9. In a method for treating a synthetic gel, silica-based cracking catalyst which has been poisoned by contamination with a metal selected from the group consisting of iron, nickel and vanadium due to use of said catalyst in cracking to gasoline at elevated temperature a heavier hydrocarbon feedstock containing said poisoning metal, the steps which comprise bleeding a portion of the catalyst containing said poisoning metal from the hydrocarbon cracking system, said bled catalyst being out of contact with the hydrocarbon feedstock, sulfiding poisoning metal containing component on bled catalyst by contact with a vaporous sulfiding agent at a temperature of about 500 to 1500° F., chlorinating poisoning metal containing component on the sulfided catalyst by contact with chlorinating vapors at about room temperature to 900° F., subjecting the catalyst to a reducing agent selected from inorganic sulfur-containing reducing gases and aqueous solutions of hydroxylamine hydrazine, sodium hypophosphite, ammonium hypophosphite, hydrogen iodide and water-soluble inorganic sulfur-containing reducing agents, washing the catalyst with an aqueous medium having a pH below about 5 and sufficient to remove metals and improve the subsequent cracking performance of catalyst and returning the resulting demetallized catalyst to a hydrocarbon cracking system.

10. The method of claim 9 in which the catalyst is silica-alumina.

References Cited by the Examiner

UNITED STATES PATENTS

| | | | |
|---|---|---|---|
| 2,388,302 | 11/1945 | Weyl | 252—411 |
| 2,481,253 | 9/1949 | Snyder | 252—415 X |
| 2,488,744 | 11/1949 | Snyder | 252—415 X |
| 2,849,406 | 8/1958 | Lane | 252—413 |
| 3,122,510 | 2/1964 | Burk et al. | 252—413 |
| 3,122,511 | 2/1964 | Foster | 252—413 |

FOREIGN PATENTS 596,177 4/1960 Canada.

MAURICE A. BRINDISI, *Primary Examiner.*